United States Patent Office
3,704,231
Patented Nov. 28, 1972

3,704,231
CHEMILUMINESCENT ADDITIVES
Laszlo Joseph Bollyky, Stamford, Conn., assignor to American Cyanamid Company, Stamford, Conn.
Continuation of abandoned application Ser. No. 675,141, Sept. 13, 1967, which is a continuation-in-part of application Ser. No. 577,595, Sept. 7, 1966. This application Feb. 16, 1971, Ser. No. 115,734
Int. Cl. C09k 3/00
U.S. Cl. 252—188.3                   5 Claims

ABSTRACT OF THE DISCLOSURE

A chemiluminescent system having as a chemiluminescent reactant (1) aromatic oxalic-type esters or (2) glyoxal-type compounds, which react with a hydroperoxide to produce chemiluminescent light in the presence of a fluorescer, the system including as an additive neutral and basic salts having cations from the group of alkali metal, tetraalkyl and tetraaryl ammonium, arsenium and phosphonium cations which give improved brightness and quantum yield to the system.

---

This application is a continuation of application Ser. No. 675,141, filed Sept. 13, 1967, which is a continuation-in-part of application Ser. No. 577,595, filed Sept. 7, 1966.

This invention relates to a novel chemiluminescent composition which is a combination of a chemiluminescent reactant, a fluorescent compound and additive ingredients, which when reacted with a hydroperoxide produce greater quantum yield, higher light intensities, and larger total chemiluminescent light yields than those obtainable from the reactants in the absence of additives or from prior chemiluminescent compositions. The greater total chemiluminescent light yield is obtained as a consequence of a greater tolerance of the chemiluminescent system to high reactant concentrations in the presence of the additives of this invention. In prior chemiluminescent compositions an increase of total light yield through a higher reactant concentration was limited seriously because increasing reactant concentrations led to sharply decreasing quantum yield.

The reactants considered as part of the chemiluminescent composition of this invention include (1) the esters of oxalic-type acids which are the subject matter of copending application, Ser. No. 491,896, and the glyoxal-type compounds of copending application, Ser. No. 547,782.

By chemiluminescent light as referred to herein is meant electromagnetic radiation at wavelength falling between about 350 m$\mu$ and about 1000 m$\mu$. The quantum yield is a measure of the light producing efficiency of a chemiluminescent system; it is defined as Einsteins of emitted light per mole of chemiluminescent reactant.

Another quantity, the radiation capacity measures the total light emitted by the system when the 1t reactant is present in a given concentration. Thus radiation capacity is the product of quantum yield and reactant concentration as shown by Equation 1:

(1)  $R = QM$ where
Q = quantum yield
M = molar concentration of reactant

There is still another quantity, light capacity which takes into account the varying sensitivity of human eye with the wavelength of the emitted light. The light capacity (L) is a product of radiation capacity and two factors, (1) that describe the sensitivity of the human eye to the yellow (555 m$\mu$) light and (2) the phototopic factor (P) which compares the ability of the eye to see a given wavelength light with the ability to see the yellow light. Equation 2 defines light capacity.

(2)  $L = 4.07 \times R \times P$ (lumen-hours l$^{-1}$)

Figure 1:
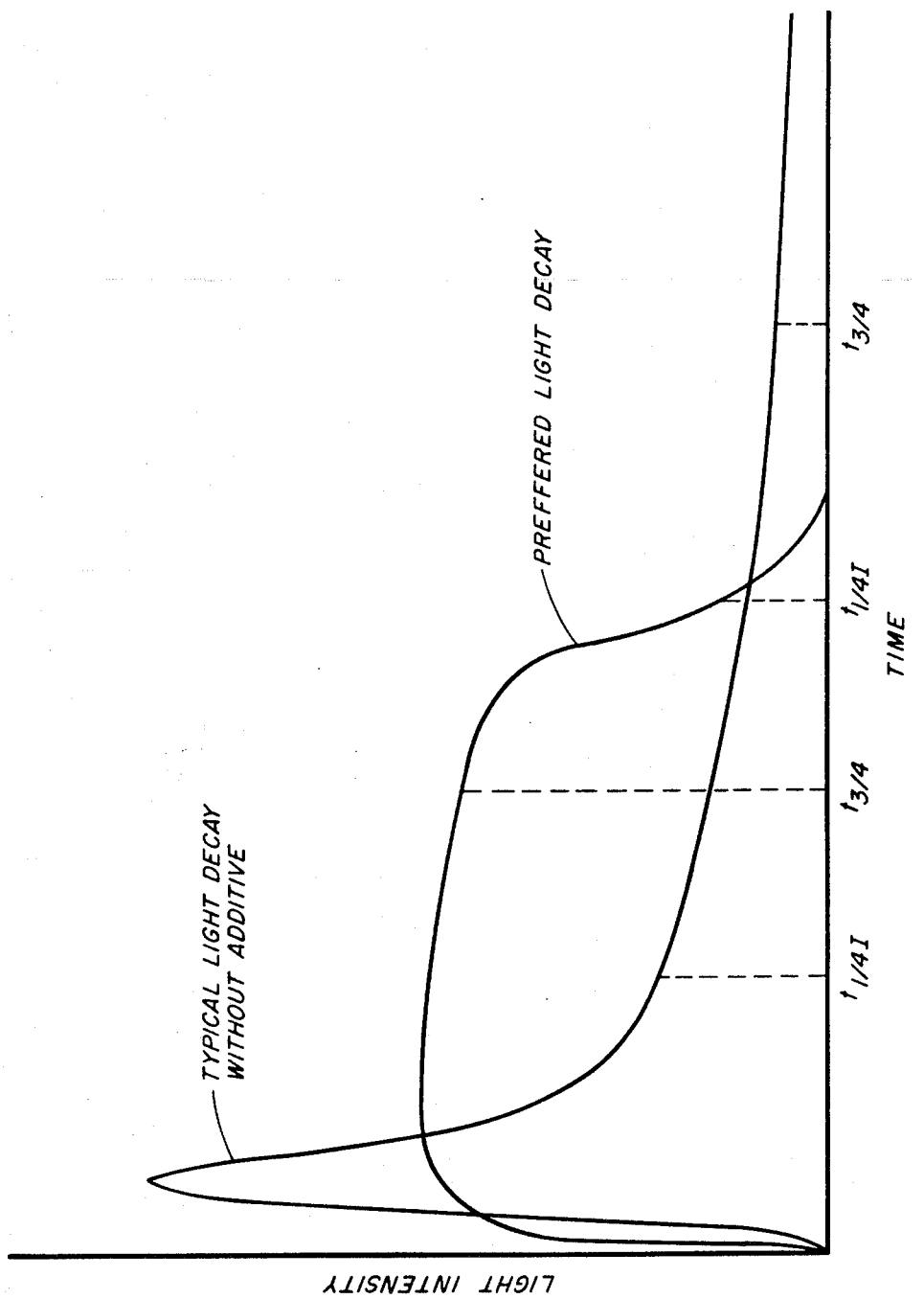

The kinetics of the chemiluminescent reaction is complex and this complexity is reflected in the light decay curve. The typical reaction without additives emits a bright burst of light initially which is followed by a long, lower level tail emission. For most practical applications a relatively constant bright emission is preferred throughout most of the chemiluminescent lifetime. A typical light decay curve and a preferred curve are both shown in FIG. 1. In other to determine how closely a certain decay curve approximate the preferred curve, a ratio of two arbitrary quantities $t\frac{1}{4}$ I time and $t\frac{3}{4}$ lifetime are measured. The $t\frac{1}{4}$ I time represents the light decay time from the maximum to $\frac{1}{4}$ intensity, whereas the $t\frac{3}{4}$ lifetime measures the time required for the emission of $\frac{3}{4}$ of the total light. In general, the larger ratio $t\frac{1}{4}I/t\frac{3}{4}$, the more uniform is the emission intensity. A ratio of close to one or larger is preferred for most practical applications. This method provides a means for evaluating the light decay when the shape of the decay curve is similar to the typical curve. For possible atypical decay curves this simple method is not valid and cannot replace the visual comparison of curves.

Prior to the present invention, the employment of the known catalytic accelerators of chemiluminescent reactions appeared to increase the reaction rate and thereby the maximum light intensity solely at the expense of lifetime. This type of accelerator is used to the best advantage in connection with chemiluminescent reactions which normally produce low light intensities over a long period of time. By accelerating the reaction the light intensity is increased and a shorter lifetime is obtained which is sufficiently long to be of practical value. Catalytic accelerators of this type merely increase the rate of light emission but leave the quantum yield unchanged or often decrease it. It should be noted, however, that the reliable prediction of materials which would have such catalytic accelerating effect has not always been possible heretofore.

The above mentioned copending applications disclosed the use of certain catalytic accelerators, specifically basic compounds for the oxalic-type ester system and acids for the glyoxal-type systems. The present invention, in contrast to the above mentioned inventions, relates to the use of additives which are newly discovered catalytic accelerators (thus brightness improvers) which in addition usually produce higher quantum yields and greater light capacities (by means of greater tolerance of the system to high reactant concentrations) than obtainable in the absence of these additives.

The additives of this invention may be employed together with other catalytic accelerators or with lifetime extenders to produce a high emission intensity, high light capacity and a chemiluminescent lifetime which is variable throughout a broad range of a few minutes to a few hours. Lifetime extenders useful in connection with the oxalic-type ester system include acids described in copending application, Ser. No. 547,782.

The additives of this invention used separately or in combination with basic, acidic or other lifetime control additives, thus provide improved lifetime control and generally higher useful light outputs. Another advantage of the combination use of both the additive salt and the decelerator, is to obtain a stabilizing effect on the reaction lifetime at the time of reaction, in order to reduce the adverse effects of one or more various minor contaminants possibly (1) present in the chemiluminescent composition, or (2) accumulating in the composition during storage.

It is therefore an object of this invention to provide a process for the acceleration of a chemiluminescent reaction which results in increased brightness.

Another object is to provide chemiluminescent composition having a higher effective concentration of chemiluminescent reactant than heretofore has been possible in the maximization of light production.

Another object is to provide a process in which higher concentrations of a chemiluminescent reactant may be employed to obtain higher maximum intensity through increased light capacity.

Another object is to provide a chemiluminescent composition which is characterized by variations of one or more performance factors such as the lifetime, the light intensity, and quantum yield, while concurrently maintaining one or more thereof at either substantially the same or higher levels of performance.

Another object is to provide a chemiluminescent process in which one or more of the performance factors in the preceding paragraph may be varied while concurrently maintaining either substantially the same or higher levels of performance of reaction lifetime, the quantum yield, and the light intensity.

These and other objects of this invention will become apparent from the preceding and following disclosure.

The term "chemiluminescent composition," as used herein, means a mixture of all the ingredients which will result in a reaction to produce chemiluminescence.

The term "chemiluminscent reaction component," as used herein, means a mixture which will result in a chemiluminescent reaction when reacted with other necessary reactants in the processes as disclosed herein.

The term "fluorescent compound," as used herein, means a compound which fluoresces in a chemiluminescent reaction, or a compound which produces a fluorescent compound in a chemiluminescent reaction.

The term "peroxide compound," as used herein, also includes compounds which upon reaction produce the peroxide group.

The term "hydrogen peroxide compound" includes (1) hydrogen peroxide and (2) hydrogen peroxide-producing compounds.

The term "hydroperoxide compound" as used herein is limited to peroxide compounds having at least one HOO— group, or a compound which upon reaction produces a compound with such a group.

The term "peroxidic groups," as used herein, represents HOO—, ROO—, or

R is a substituent such as alkyl, cycloalkyl, α-hydroalkyl, substituted alkyl, for example, and $R^1$ may be R or an aromatic radical.

The term "diluent," as used herein, means a solvent or a vehicle which when employed with a solvent does not cause insolubility.

The term "admixing," as used herein, means "reacting" or sufficiently bringing together component reactants to obtain a chemiluminescent reaction.

The objects of this invention are obtained by the employment of one or more compounds of a selected group in combination with conventional ingredients normally necessary to obtain chemiluminescene, such as a fluorescer, a chemiluminescent reactant, a hydroperoxide, and a suitable diluent.

This invention is limited, however, to two distinct chemiluminescent reactants, (1) an aromatic oxalic-type ester of the type disclosed in copending application, Ser. No. 491,896, filed Sept. 30, 1965, and (2) a glyoxal-type compound described in the copending application, Ser. No. 547,782, filed May 5, 1966, the disclosures of which are hereby incorporated by reference. The particular group of compounds which when employed with these two chemiluminescent reactant systems to obtain the objects of this invention may broadly be defined as any one or more additive compounds selected from the group consisting of (1) an alkali metal salt, (2) tetraalkyl and tetraaryl quaternary ammonium, arsenium, and phosphonium salts, and (3) basic salts which include as cations alkali metal cations or tetraalkyl, or tetraaryl ammonium phosphonium and arsenium cations. Lithium nitrate is a quencher of the chemiluminescent reaction.

The additive salts of this invention are in general characterized by (1) being at least partially soluble in organic solvents, (2) having the tendency (property) to dissociate into solvated ions (as indicated by conductivity), and (3) having the tendency to form ion aggregates with the phenol by-product of the chemiluminescent reaction.

The preferred chemiluminescent reactants of this invention are electro-negatively substituted phenolic oxalic-type esters. The tetra alkylammonium salts are the preferred group of additive compounds for purposes of this invention.

The solubility of the additive salt normally should be at least about $1 \times 10^{-6}$ mole $1^{-1}$ in the organic solvent of the chemiluminescent reaction. The tendency to dissociate into individually solvated ions is measured in terms of conductivity. An insufficient degree of dissociation tends to render a salt ineffective even though it may be soluble in the solvent.

Solubility and conductivity are usually interrelated, and the salt preferably is characterized by having both properties. The salts of large tetra alkyl ammonium cations are usually soluble in organic solvents.

The chemiluminescent reactions of aromatic oxalic esters are catalyzed by bases, retarded by acids and quenched by free radical inhibitors, discussed fully in U.S. Serial No. 491,896. These effects, although they are not a part of this invention, must be considered as within the scope of variations of the present invention, used in conjunction with the additive salt of this invention. Acids, bases and free radical inhibitors produce the expected normal effect when used in conjunction with the present invention.

The ester suitable for use in applicant's invention includes a large number of compounds of phenolic esters of the oxalic-type acids of the typical formula $$R^1OCO(CO)_nOR^{11}$$

in which $n$ is at least one and in which $R^1$ and $R^{11}$ may be any aromatic group, including substituted aromatic groups. To obtain the optimal and preferred results of this invention, it is critical that the ester reactant be selected from the group consisting of an oxalic-type ester of an aromatic alcohol characterized by an acid ionization constant in water greater than $1.3 \times 10^{-10}$. It should be noted that the above acid ionization constant (in water) may be stated in terms of the Hammett Sigma Value of an unsubstituted or substituted alcohol (conventionally aromatic alcohols), whereby the Hammett Sigma Value would be greater (positive) than zero for the substituent of a substituted alcohol which is characterized by an acid ionization constant greater than $1.3 \times 10^{-10}$.

Typical aromatic oxalic-type esters which may be employed are esters such as A and B below:

(A) Aromatic esters of the following types:

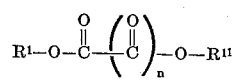

where $R^1$ or $R^{11}$ are:
Aryl groups: e.g., phenyl, naphthyl, or substituted aryl groups by typical substituents such as:
    (a) by halogen groups: e.g., chlorophenyl, bromophenyl, trichlorophenyl;
    (b) by acyloxy groups: e.g., benzolyloxyphenyl;

(c) by carbonyl groups: e.g., formylphenyl, acetylphenyl;
(d) by carboxyl groups: e.g., carboxyphenyl;
(e) by heterocyclic groups: e.g., pyridylphenyl, tetrahydrofurylphenyl;
(f) by sulfo groups: e.g., sulfophenyl, 4-sulfonaphthyl.

(B) Other oxalic-type aromatic esters of alcohols, such as aromatic diols: e.g., catechol, nitrocatechol.

The chemiluminescent glyoxal-type compound of the nature disclosed in copending application, Ser. No. 547,782, is represented by the formula:

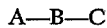

in which B is a polycarbonyl group which is a substituent of each A and C, B being of the formula:

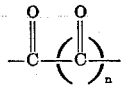

where $n$ is an integer of at least one, in which A as a $Q^1$hydro-$Q^2$ oxo substituted nitrogen containing aromatic compound onto which one terminal carbonyl group of said B is substituted at a nitrogen atom of said A, in which A is a $Q^1$hydro-$Q^2$ oxo substituted nitrogen containing aromatic compound in which each of $Q^1$ and $Q^2$ is an integer of at least one and the value of $Q^1$ is twice the value of $Q^2$, in which $Q^1$ describes the number of hydro substituents present on the aromatic groups, and $Q^2$ describes the number of oxo substituents present on the aromatic group, and in which said C is a compound selected from the group consisting of (1) said A, (2) an alcohol of the formula $R^1$—O—H forming an ester of a carbonyl group of said B, in which $R^1$ is selected from the group consisting of (a) aryl, (b) electronegatively substituted alkyl, (c) heterocyclicalkylaryl, and (d) unsaturated alkyl, and (3) an amine which forms an amide with a terminal carbonyl group of said B and which amine is selected from the group consisting of

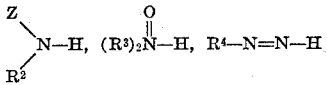

and strongly electronegatively N-substituted (substituted or non-substituted) nitrogen-containing heterocyclic compounds, where the N— is attached directly to a terminal carbonyl of said B.

In the preferred embodiment "C" is the same as "A," thereby forming the preferred symmetric polycarbonyl compound such as bis(1,2-dihydro-2-oxy-1-pyridyl) glyoxal.

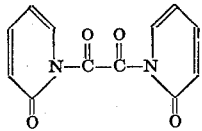

When bis(1,2-dihydroxy-2-oxy-1-pyridyl)glyoxal is employed as the reactant to obtain the objectives of this invention it is reacted with hydrogen peroxide in the presence of an acidic material, a fluorescent compound and the newly invented additives.

The peroxide employed in the compositions and process of this invention may be obtained from any hydroperoxide compound. Hydrogen peroxide and its compounds, however, are preferred. The peroxide may be employed as sodium peroxide. Alternatively, sodium perborate may be placed in aqueous solution whereby a solution of hydrogen peroxide is obtained. Obviously, hydrogen peroxide or its solution may be employed. The presence of water and/or base is not critical to obtain the preferred optimum maximum-radiation capacity. In certain embodiments of this invention, the peroxide employed may be obtained from anhydrous hydrogen peroxide compounds such as perhydrate or urea (urea peroxide), perhydrate of pyrophosphate (sodium pyrophosphate peroxide), pyrohydrate of histidine (histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc. of the type which would provide a suitable diluent for the composition of this invention. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-4}$ molar. The ester of this invention may be added as a solid or in admixture with a suitable solid peroxide reactant or in a suitable diluent, or alternatively dissolved directly in a solution containing the peroxide reactant.

Typical diluents within the purview of the instant discovery are those that do not readily react with a peroxide such as hydrogen peroxide, and which do not readily react with an ester of oxalic acid. The following are illustrative of the diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, ethyl benzoate, and the like; aromatic hydrocarbons, such as benzene, dichlorobenzene, xylene, toluene, and the like. However, with the preferred peroxide, hydrogen peroxide, solvents incapable of dissolving at least 1 g. per liter of hydrogen peroxide should preferably be modified by the addition of a solubilizing cosolvent.

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 1000 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$-$C_{16}$), and other like substituents which do not interfere with the light-generating reaction contemplated herein.

Numerous other fluoroescent compounds having the properties given hereinabove are well known in the art. Many of these are fully described in "Fluorescence and Phosphorescence," by Peter Pringsheim, Interscience Publishers, Inc., New York, N.Y., 1949. Other fluorescers are described in "The Colour Index," Second Edition, volume 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, a fluorescent ester such as the oxalic acid ester of 2-naphthol 3,6,8-trisulfonic acid does not reuire a separate fluorescent compound to obtain light. Other typical fluorescent oxalic acid esters include esters of oxalic acid (1) 2-carboxyphenol, (2) 2-carboxy-6-hydroxyphenol, (3) 1,4- dihydroxy-9,10-diphenylanthracene, and (4) 2-naphthol. Thus, a reactant including a fluorescent oxalic type ester would thereby include at least one fluorescent compound.

It has been found that the molar (moles per liter of diluent) concentrations of the major components of the novel composition herein described may vary considerably. It is only necessary that components be in sufficient concentration to obtain chemiluminescence. The ester (of the oxalic-type acid) molar concentration normally is in the range of at least about $10^{-7}$ to 5 molar, preferably in the range of at least about $10^{-4}$ to about 1 molar; the fluorescent compound is present in the range from about $10^{-5}$ to 5, preferably $10^{-4}$ to $10^{-1}$ molar; and the water or other diluent must be present in a sufficient amount to form at least a partial solution of the reactants involved in the chemiluminescent reaction. There is no known maximum limit on the concentration of ester employed in the reaction. The ester may serve as either the sole diluent or a partial diluent, for example.

The ingredients of the composition of this invention may be admixed in a single state of admixing or in a sequence of steps of admixing the separate ingredients. Accordingly, alternative compositions may be prepared which may be stored over a period of time and which may be admixed with the final ingredient at a time when the chemiluminescent lighting is desired. For example, one such composition would be a solid composition which includes an oxalic acid ester, the additive salt of this invention, and a fluorescent compound, but which does not include a peroxide compound and diluent. Another alternative composition would be a liquid composition which includes the additive of this invention, the fluorescent compound and a peroxide, but which does not include the oxalic ester. Another alternative solid composition would be a solid composition which includes a solid oxalic-type ester and a solid hydroperoxide compound, a solid additive of this invention, and possibly additionally includes a solid fluorescent compound, but which does not include a diluent. Obviously the preferred composition which would be less than all necessary components to produce a chemiluminescent light would be a composition which would be substantially stable to a practical degree over an extended period of time; otherwise, there would be no real advantage in forming a chemiluminescent reactant to be employed in a subsequent chemiluminescent reaction.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

Accordingly, the wavelength of the light emitted by the composition of this invention will vary depending upon the particular fluorescent component employed in the reaction.

Although in the process of obtaining chemiluminescent light according to this invention, it is normally not necessary to employ a specific order of sequence of steps in the adding of the individual ingredients of the inventive chemiluminescent composition. It has been found that the fluorescent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about −40° C. and 75° C., preferably between aboute 0° C. and 50° C.; however, the luminescence of applicant's process is not limited to these ranges. However, temperature is not critical.

Additionally, the composition and the process which obtains chemiluminescent light from an oxalic-type ester reactant may employ a base in an amount sufficient to produce a basic pH. Any suitable base which does not interfere with the chemiluminescent composition and process of this invention may be employed. A wide variety of organic and inorganic bases is contemplated, typical bases being: sodium carbonate, sodium hydroxide, potassium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like, etc.

The composition and the process which obtains chemiluminescent light from the oxalic-type ester may optionally employ an acid in an amount sufficient to produce an acidic pH. In the presence of acid the lifetime of the chemiluminescent reaction is extended.

Additionally, the composition and the process which obtains preferred optimum chemiluminescent light intensity from the non-ester glyoxal type composition of this invention employs an acid in an amount sufficient to produce an acidic pH. Any suitable acid which does not interfere with the chemiluminescent combination and process of this invention may be employed.

The glyoxal preferred composition and the preferred process which obtain chemiluminescent light employs an acid in an amount sufficient to produce an acidic pH. The acids that are effective include those compounds that are characterized by an acid ionization constant in water greater than $1 \times 10^{-8}$ as:

(a) carboxylic acids: e.g., formic acid, acetic acid, propionic acid, chloroacetic acid, dichloroacetic acid, trichloroacetic acid, benzoic acid, nitrobenzoic acid, dinitrobenzoic acid; oxalic acid, malonic acid;
(b) phenols: e.g., dinitro-o-cresol, dinitrophenyl, picric acid;
(c) sulfonic acids: e.g., benzenesulfonic acid, methanesulfonic acid, toluene-sulfonic acid;
(d) inorganic acids: e.g., phosphoric, hydrochloric, sulfuric, nitric acid.

However, the presence of acid is not essential to obtain chemiluminescence.

Additionally, the lifetime and the intensity of the chemiluminescent light for the glyoxal composition of this invention can be regulated by the use of certain regulators such as:

(1) By the addition of acid to the chemiluminescent composition to increase intensity and decrease lifetime, and by the addition of base to decrease intensity. Both the strength and the concentration of the base are critical for purposes of exactness in regulation.
(2) By the variation of hydroperoxide. Both the type and the concentartion of hydroperoxide may be effective for the purposes of exactness in regulation.

Although the mechanism of the additive effects of this invention is not completely understood at the present the main factors believed to influence the magnitude of the effect are as follows: (a) the lower the dielectric constant and the solvating power of the solvent, the more pronounced the additive effect; (b) the more soluble the additive salt, the stronger the effect; (c) the specific nature of the additive is more important than its concentration; (d) the specific nature of oxalic ester or glyoxal reactant is important. Thus, a specific additive salt is not equally effective with all oxalic ester reactants in all solvents.

The hydrolysis of aromatic esters of oxalic acid with the traces of moisture possibly present in the organic solvent is accelerated by the additive salts of this invention. Moreover, the hydrolysis also produces oxalic acid which may accumulate in the ester solution. Oxalic acid is now known to retard the rate of the oxalic ester-hydrogen peroxide-fluorescer chemiluminescent reaction, U.S. Ser. No. 577,615. Therefore, the chemiluminescent reaction of the stored oxalic ester solution is affected by hydrolysis by both the consumption of a portion of the ester and by the presence of the oxalic acid formed. Thus, the oxalic ester preferably should be "stored" in anhydrous solvent separately from the additive salts, unless the storage period is to be merely a short period of time.

Alkali metal ions present in conventional soft glass decrease the stability of the oxalic-type ester. Therefore, the chemiluminescent light production is also decreased from aromatic oxalic ester solution previously stored in glass containers. Phenols, like 2,4-dinitrophenol, are known to react slowly in benzene solution with the sodium and potassium ions present in conventional glass containers. The reaction is even faster with finely divided insoluble sodium acetate. Although the accelerating acivity of sodium present in glass salts is too minor to be of practical value for accelerating purposes in a chemiluminescent reaction, the action is sufficient to have definite detrimental effects on long term storage stabliity. Thus, when an aromatic ester of oxalic acid, stored in contact with conventional glass or other mineral which contains alkali metal ions, is reacted with hydrogen peroxide in the presence of a fluorescer, the salt and quantum efficiency of the reaction are decreased. Accordingly, unless storage is merely for a short period of time, storage should be in non-glass containers and should be in a container substantially free of alkali metal cations.

Containers suitable to store solution of aromatic oxalic esters should be stable to organic solvents used for the chemiluminescent reaction and should contain a minium possible amount of alkali metal ions. When the chemiluminescent reaction is carried out in the storage container, the container should also be transparent or at least translucent. Materials that fulfill all three requirements include quartz, and polyethylene, and other plastic materials, for example.

The effect of oxalic acid formed during the storage of the oxalic ester solution can be compensated by the addition of an additive salt of this invention to the chemiluminescent reaction mixture. A buffer system consisting of a tetra-alkylammonium salt and oxalic acid may be prepared which on addition to the oxalic ester system produces predictable reaction rate and quantum efficiency.

Since the additives of this invention when present in oxalic ester solution during storage may under certain conditions reduce the storage stability of such solutions, a novel article of manufacture would be a composition in which the ester and the accelerator are separated by having solely one of them in a separate frangible container.

The following examples are given to illustrate the invention and are not intended to be limitative.

EXAMPLE I

Qualitative chemiluminescent tests designed to examine the effect of various additives on the bis(pentafluorophenyl)oxalate - hydrogen - peroxide - fluorescent compound chemiluminescent system were carried out as follows. Two experiments were carried out simultaneously, one experiment with the additive and the other in the absence of additive. Approximately 2 mg. bis(pentafluorophenyl)oxalate was added to a 5 ml. solution of 1 mg. 9,10-diphenylanthracene and 0.2 ml. 0.31 molar hydrogen peroxide in anhydrous dimethyl phthalate solvent. In the other experiment approximately 2 mg. bis(pentafluorophenyl)oxalate and about 2 mg. additive being tested were added to 5 ml. solution of 1 mg. 9,10-diphenylanthracene and 0.2 ml. 0.31 molar hydrogen peroxide in anhydrous dimethyl phthalate.

The effect of the additive was determined by visual comparison of the chemiluminescent light emission obtained from the two experiments in a dark room. The reference reaction without additive was rated arbitrarily as M (medium). The additive reaction was rated either MS (medium strong), VS (very strong) when respectively moderately stronger or very much stronger light emission was observed or MW (medium weak) and VW (very weak) when respectively moderately weaker or very much weaker light emission was observed than available from the reference reaction.

The results in Table I indicate the effect of tetraalkyl ammonium, tetraalkyl arsonium, tetraaryl arsonium and tetraalkyl phosphonium salts. These salts are soluble in many organic solvents and consist of a large hydrocarbon containing cation and an inorganic or organic large or small anion. The effects of a few alkali metal salts are also shown in Table I.

TABLE I

| Additive | Light intensity |
|---|---|
| (a) $(n\text{-Butyl})_4N^+ClO_4^-$ | VS |
| (b) $(n\text{-Propyl})_4N^+BF_4^-$ | VS |
| (c) $(n\text{-Propyl})_4N^+PF_6^-$ | VS |
| (d) $(\text{Ethyl }+)_4N^+Cl^-$ | VS |
| (e) $(\text{Ethyl }+)_4N^+Br^-$ | VS |
| (f) $(\text{Phenyl})_4As^+Cl^-$ | VS |
| (g) $(CH_3)_4N^+F^-$ | VS |
| (h) $(CH_3)_4N^+Br^-$ | VS |
| (i) $(CH_3)_4N^+C_6H_{13}CO_2^-$ (both a large cation and anion) | VS |
| (j) $(CH_3)_4N^+C_3H_7CO_2^-$ (both a large cation and anion) | VS |
| (k) $Rb^+Cl^-$ | VS |
| (l) $Rb^+Br^-$ | VS |
| (m) $KH_2PO_4$ | MS |
| (n) $(CH_3)_4N^+AsF_6^-$ | MS |
| (o) $(CH_3)_4As^+Cl^-$ | MS |
| (p) $(C_4H_9)_4P^+Br^-$ | MS |
| (q) $Ca^{++}(HCO_2^-)_2$ | M-MS |
| (r) $Li^+CH_3CO_2^-$ | M-MS |

EXAMPLE II

The experiments were carried out as in Example I. The results in Table II show the effect of partially soluble salts which consist of a small inorganic cation and a larger organic or inorganic anion. In general no substantial effect was observed.

TABLE II

| Additive | Effect on light emission |
|---|---|
| (a) $Li^+CF_3CO_2^-$ | M |
| (b) $Li^+CCl_3CO_2^-$ | M |
| (c) $Li^+Cl^-$ | M |
| (d) $Li_3^+PO_4^-$ | M |
| (e) $K^+C(CN)_3^-$ | M |
| (f) $Na^+CCl_3CO_2^-$ | M |

EXAMPLE III

The experiments of this example were carried out as in Example I, except 1,2-dimethoxyethane solvent was used. The results in Table III show that the solubility of the additive salt does not necessarily predetermine the effect of the salt on the chemiluminescent reaction, and that 1,2-dimethoxyethane may be used as solvent.

TABLE III

| Additive | Solubility | Effect on light emission |
|---|---|---|
| a | None | M |
| b $(n\text{-butyl})_4N^+ClO_4^-$ | Soluble | MS |
| c $NaB(\text{phenyl})_4$ | do | VW |
| d $Li^+CF_3CO_2^-$ | do | W |
| e $Li^+ClO_4^-$ | Partially soluble | VW |
| f $KH_2PO_4$ | Insoluble | MS |
| g $Ca^{++}(HCO_2^-)_2$ | do | VS |
| h $Rb^+Br^-$ | do | VS |
| i $Rb^+Cl^-$ | do | VS |
| j $K_2^+SO_4^-$ | do | M-MS |
| k $Li^+Cl^-$ | do | VW |

EXAMPLE IV

The experiments of this example were carried out as in Example I. The results in Table IV again show that the solubility of the salt alone does not determine the effect of the additive on the chemiluminescent reaction in dimethyl phthalate solvent.

TABLE IV

| | Additive | Solubility | Effect on light emission |
|---|---|---|---|
| a | None | | M |
| b | (n-Butyl)$_4$N$^+$ClO$_4^-$ | Soluble | VS |
| c | Na B(phenyl)$_4$ | Partially soluble | W |
| d | Rb$^+$Br$^-$ | Insoluble | VS |
| e | Rb$^+$Cl$^-$ | do | VS |
| f | KH$_2$PO$_4$ | do | MS |
| g | Ca$^{++}$(HCO$_2^-$)$_2$ | do | M-MS |

TABLE V

| | Additive | Effect on light emission |
|---|---|---|
| a | (Butyl)$_4$N$^+$ClO$_4^-$ | MS |
| b | (Butyl)$_4$N$^+$ClO$_4$ + CH$_3$CO$_2$H | MS |
| c | (Butyl)$_4$N$^+$ClO$_4$ + KOH | MS |
| d | (Butyl)$_4$N$^+$ClO$_4$ + CH$_3$SO$_3$H | VW |
| e | (Butyl)$_4$N$^+$ClO$_4$ + (CO$_2$H)$_2$ | MW |

EXAMPLE VI

The effect of tetrabutyl ammonium perchlorate on the chemiluminescent light emission of the oxalic ester-hydrogen peroxide-fluorescent compound system was measured quantitatively by means of a radiometer-spectrophotometer. The results of the measurements with two different oxalic esters are shown in Table VI.

The reactions were carried out in dimethyl phthalate solution at 25° C.

TABLE VI

| | Oxalic ester | H$_2$O$_2$ (mole l$^{-1}$ ×10$^2$) | Fluorescer (mole l$^{-1}$×10$^4$) | (n-butyl)$_4$N$^+$ClO$_4$ (mole l$^{-1}$ ×10$^2$) | $t_{3/4}$ [a] A. (min.) | $I_{max}$ [b] (foot lamberts) | Quantum yield (Einsteins mole$^{-1}$ ×10$^2$) [c] | Radiation capacity (Einsteins l$^{-1}$×10$^4$) |
|---|---|---|---|---|---|---|---|---|
| a | Bis(pentafluorophenyl)oxalate (0.01 mole l$^{-1}$) | 3.8 | DPA(6.0)[d] | None | 286.0 | 0.14 | 5.3 | 5.3 |
| b | do | 3.8 | DPA(6.0) | 3.0 | 23.0 | 0.80 | 10.2 | 10.2 |
| c | Bis(2,4-dinitrophenyl)oxalate (0.01 mole l$^{-1}$) | 2.5 | Rubrene (5.0) | None | 3.62 | 224 | 18.6 | 18.6 |
| d | do | 2.5 | do | 10.0 | 0.85 | 1,484 | 23.8 | 23.8 |
| e | do | 2.5 | do | 1.0 | 1.46 | 800 | 23.5 | 23.5 |
| f | do | 2.5 | do | 0.1 | 2.48 | 472 | 21.2 | 21.2 |
| g | Bis(2,4-dinitrophenyl)oxalate (0.001 mole l$^{-1}$) | 0.25 | do | None | 28.4 | 1.87 | 25.9 | 2.59 |
| h | do | 0.25 | do | 1.0 | 8.66 | 6.08 | 25.4 | 2.54 |
| i | Bis(2,4-dinitrophenyl)oxalate(0.02 mole l$^{-1}$) | 5.0 | Rubrene (12.8) | None | 2.07 | 145.0 | 6.8 | 13.6 |
| j | do | 5.0 | do | 1.0 | 0.61 | 815.0 | 9.9 | 19.8 |

[a] The time required for the emission of 75% of the available light.
[b] Maximum light intensity.
[c] Absolute quantum yield based on the oxalic ester.
[d] 9,10-diphenyl anthracene.

EXAMPLE V

In this example experiments were carried out as in Example I except that a different ester, bis(2,6-dichloro-4-nitrophenyl)oxalate, was used in the place of bis(pentafluorophenyl)oxalate. The results in Table V show that tetrabutylammonium perchlorate accelerates the rate and increases the brightness of the chemiluminescent reaction in the presence of acetic acid or potassium hydroxide. The addition of methane sulfonic acid or oxalic acid together with the perchlorate slowed down the reaction.

The results in Table VI show that the tetrabutyl ammonium perchlorate additive accelerates the rate and increases the quantum yield of the oxalic ester chemiluminescent reaction. The radiation capacity of the reaction is also increased due to the higher tolerance of the system to high ester concentration in the presence of the additives.

EXAMPLE VII

The experiments of this example show the effect of tetrabutylammonium perchlorate (TBAP) on the chemiluminescent reactions of three different oxalic esters. As the results in Table VII indicate TBAP increased the rate and the maximum light intensity of all three reactions. The quantum yield and light capacity of the bis-(pentafluorophenyl)oxalate reaction was also increased substantially.

TABLE VII.—THE EFFECT OF TETRABUTYL AMMONIUM PERCHLORATE [Bu$_4$N$^+$ClO$_4^-$] (TBAP) ON CHEMILUMINESCENCE FROM VARIOUS OXALATE ESTERS AND RUBRENE [a]

| Ester | Bu$_4$N$^+$ClO$_4^-$ conc. (moles liter$^{-1}$) | Max. intensity [b] (ft. lamberts) | $t_{1/4}$ [c] (min.) | $t_{3/4}$A. (min.) | Quantum yield (Einsteins mole$^{-1}$ ×10$^2$) | Light capacity (lumen hrs. liter$^{-1}$) |
|---|---|---|---|---|---|---|
| Bis(2-formyl-4-nitrophenyl)oxalate [b] | 0 | 7.4 | 36.0 | 90.2 | 14.4 | 39.3 |
| | 1×10$^{-2}$ | 19.0 | 13.6 | 30.0 | 15.2 | 41.5 |
| Bis(3-trifluoro-4-nitrophenyl)oxalate [e] | 0 | 2.8 | 164.5 | 134.9 | 22.0 | 60.1 |
| | 1×10$^{-2}$ | 7.0 | 60.0 | 56.8 | 20.5 | 56.0 |
| Bis(pentafluorophenyl)oxalate [f] | 0 | 0.14 | 44.0 | 285.8 | 5.15 | 0.84 |
| | 3×10$^{-2}$ | 0.80 | 20.2 | 23.2 | 10.15 | 1.65 |

[a] Reactant concentrations: Oxalate ester=1×10$^{-2}$ M, H$_2$O$_2$=2.5×10$^{-2}$ M, Rubrene=8×10$^{-4}$ M, Solvent=dimethyl phthalate. Temperature: 25° C.
[b] Maximum chemiluminescent light intensity measured in a 1.0 cm. thick cell.
[c] The time required for the light intensity to decay to one quarter its maximum value.
[d] Rubrene concentration was 5×10$^{-4}$ M.
[e] Triethyl phosphate was used as a solvent.
[f] The fluorescer was 5×10$^{-4}$ mole l$^{-1}$ 9,10-diphenylanthracene.

EXAMPLE VIII

The experiments of the example show the effects of tetrabutylammonium perchlorate and tetrabutylammonium chloride separately and together. The results in Table VIII indicate that a greater degree of rate acceleration is obtained when the two additives are used together than when either of them is used separately.

EXAMPLE X

Experiments showing the effect of different alkali metal salts on the chemiluminescent reaction of bis(pentachlorophenyl)oxalate are shown in Table X. The results indicate that all of the five different salts shown increased the rate, brightness and the quantum yield of the reaction. The $t_{3/4}$ lifetime was shorter and the brightness was greater for all salts and the $t_{1/4}$ time was shorter for all except $Li_2SO_4.H_2O$ than for the reaction without additive.

TABLE VIII.—CHEMILUMINESCENCE FROM 2,4,5-(TRICHLOROPHENYL) OXALATE (2,4,5-TCPO)[a]

| 2,4,5-TCPO (M) | Additive[b] | Additive (M) | Max. I[c] (ft. lamberts) | $t_{1/4}$[d] (min.) | $t_{3/4}$L[e] (min.) | Quantum yield[f] (Einsteins mole$^{-1}$ ×10$^2$) |
|---|---|---|---|---|---|---|
| 0.010 | None | None | Too weak to measure | | | |
| 0.010 | TBAP | 6.7×10$^{-2}$ | Too weak to measure | | | |
| 0.010 | TBAC | 3.3×10$^{-3}$ | 14.9 | 19.1 | 15.6 | 7.77 |
| 0.010 | TBAP plus TBAC | 6.7×10$^{-2}$  3.3×10$^{-4}$ | 21.7 | 3.3 | 19.6 | 8.05 |

[a] Reactions with 0.025 M $H_2O_2$ and 6.0×10$^{-4}$ M rubrene in 84% dimethyl phthalate-16% benzene (volume percent) at 25° C.
[b] TBAP is tetrabutylammonium perchlorate. TBAC is tetrabutylammonium chloride.
[c] Maximum brightness measured in a 1.0 cm. thick cell.
[d] The time that the light intensity remained above one-quarter its maximum value.
[e] The time required for the emission of three-quarters of the total light output.
[f] Based on oxalate ester.

EXAMPLE IX

The experiments of this example show the effect of tetrabutylammonium perchlorate (TBAP) on the bis(2,4,6-trichlorophenyl)oxalate chemiluminescent reaction in the presence of a number of fluorescers in several solvents. The results in Table IX indicate that a fast rate, a bright light emission and a high quantum yield is obtained in the presence of TBAP, whereas only a dim light and low quantum yield is observed in the absence of TBAP. Furthermore, exceptionally high light capacities up to 147 lumen-hour l$^{-1}$ can be obtained in the presence of TBAP.

TABLE X.—THE EFFECT OF ALKALI METAL SALTS ON THE BIS(PENTACHLOROPHENYL)OXALATE CHEMILUMINESCENT REACTION[a]

| Additive | Amount of additive (mg.) | $I_{max}$[b] (ft. lamberts) | $t_{1/4}$[c] (min.) | $t_{3/4}$[d] (min.) | Quantum yield (10$^2$× Einsteins mole$^{-1}$) |
|---|---|---|---|---|---|
| None | | 0.21 | 216.28 | 484.92 | 2.63 |
| RbCl | 18.1 | 10.09 | 26.38 | 18.30 | 12.45 |
| NaCl | 8.8 | 1.46 | 116.00 | 220.56 | 10.73 |
| LiCl | 6.4 | 18.01 | 12.41 | 16.08 | 10.91 |
| $K_2SO_4$ | 26.1 | 1.59 | 134.22 | 196.56 | 11.86 |
| $Li_2SO_4.H_2O$ | 19.2 | 0.51 | 306.10 | 306.18 | 8.72 |

[a] The reaction volume was 3 ml. containing the reactants at concentrations as follows: 0.01 M bis(pentachlorophenyl)oxalate (PCPO), 0.001 M 9,10-bis(phenylethynyl)anthracene and 0.02 M $H_2O_2$ in ethyl benzoate-o-dichlorobenzene (50-50% by volume) at 25° C.
[b] Maximum light intensity at 1.0 cm. thickness.
[c] Time required for light intensity to decay to ¼ of maximum intensity
[d] Time required for the emission of ¾ of available light.

TABLE IX.—EVALUATION OF BIS(2,4,6-TRICHLOROPHENYL)OXALATE (TCPO) CHEMILUMINESCENCE[a]

| Exp. No. | TCPO (moles l$^{-1}$) | Fluorescer | Additive[b] | Additive concentration (moles l$^{-1}$) | Solvent[c] | $I_{max}$[d] (ft. lamberts cm.$^{-1}$) | $t_{1/4}$I[e] (min.) | $t_{3/4}$L[f] (min.) | Quantum yield[g] (Einsteins mole$^{-1}$× 10$^2$) | Light capacity (lumen-hour l$^{-1}$) |
|---|---|---|---|---|---|---|---|---|---|---|
| 1 | [h] 0.0010 | Rubrene | TBAP | 0.067 | DMP | 0.7 | 54.6 | 53.0 | 17.9 | 5 |
| 2 | 0.010 | do | TBAP | 0.067 | DMP | 15.6 | 27.0 | 18.0 | 19.8 | 54 |
| 3 | 0.010 | DPA | TBAP | 0.067 | DMP | 0.2 | 64.0 | 56.3 | 6.2 | 1 |
| 4 | 0.010 | BPEA | TBAP | 0.067 | DMP | 2.8 | 70.7 | 59.3 | 10.0 | 25 |
| 5 | 0.010 | Rubrene | None | | 13.3% B | 2.43 | 1.0 | 360.0 | 6.47 | 18 |
| 6 | 0.010 | do | TBAP | 0.067 | 13.3% B | 11.35 | 36.0 | 30.0 | 20.90 | 57 |
| 7 | [i] 0.020 | do | TBAP | 0.067 | 26.6% B | 10.9 | 40.0 | 35.0 | 10.86 | 59 |
| 8 | [i] 0.020 | do | TBAP | 0.30 | 26.6% B | 31.7 | 14.0 | 22.0 | 9.30 | 51 |
| 9 | [j] 0.030 | do | TBAP | 0.067 | 39.9% B | 15.7 | 56.0 | 39.0 | 15.10 | 123.5 |
| 10 | [i,k] 0.030 | BPEA | TBAP | 0.067 | 39.9% B | 5.7 | 124.0 | 103.0 | 9.00 | 80 |
| 11 | [j,k] 0.030 | BPEA | TBAP | 0.067 | 50.0% B | 1.4 | 276.0 | 679.0 | 9.00 | 80 |

[a] Reactions with 0.025 M $H_2O_2$ and 6.0×10$^{-4}$ M fluorescer except where noted. DPA is 9,10-diphenylanthracene; BPEA is 9,10-bis(phenylethynyl)anthracene.
[b] TBAP is tetrabutylammonium perchlorate.
[c] DMP is dimethyl phthalate. "% B" is the volume percent benzene in combination with DMP.
[d] Maximum brightness measured in a 1.0 cm. thick cell.
[e] Time the intensity remained above one-quarter of its maximum.
[f] Time required for three-quarters of total light emission.
[g] Based on TCPO.
[h] In the absence of TBAP or other additive the intensity was too weak to measure.
[i] Fluorescer consumption occurred during the reaction.
[j] A few mg. of solid fluorescer was added at several intervals during the reaction.
[k] Fluorescer concentration was increased to 1.7×10$^{-3}$ M.

EXAMPLE XI

Experiments of the example show the effect of tetrabutyl ammonium perchlorate (TBAP), a neutral salt, and of tetrabutyl ammonium pentachlorophenolate (TBPCP), a basic salt, on the bis(pentachlorophenyl)oxalate chemiluminescent reaction. The results summarized in Table XI indicate that both ammonium salts increased the quantum yield and the brightness and reaction rate. A substantially higher quantum yield was obtained with TBAP and TBPCP than with potassium pentachlorophenolate.

TABLE XIII.—THE EFFECT OF TBAP ON THE CHEMILUMINESCENT REACTION OF TCPO IN BUFFERED SOLUTION [a]

| TBAP (mole l$^{-1}$) | $I_{max}$ [b] (ft. lamberts) | $t_1/_4I$ [c] (min.) | $t_3/_4$ [d] (min.) | Quantum yield ($10^2 \times$ Einsteins l$^{-1}$) |
|---|---|---|---|---|
| None | 25.7 | 11.7 | 130.6 | 11.6 |
| 5×10$^{-2}$ | 17.5 | 49.2 | 72.3 | 10.4 |

[a] Reaction concentrations were 3×10$^{-2}$ M bis(2,4,6-trichlorophenyl)oxalate (TCPO), 3×10$^{-3}$ M 9,10-bis(phenylethynyl)anthracene (BPEA), 7.5×10$^{-2}$ M H$_2$O$_2$ and 8×10$^{-4}$ M salicylic acid—5×10$^{-5}$ M tetrabutylammonium hydroxide buffer in ethyl benzoate—2-octanol (92–8%) solvent mixture at 25° C. The additive was tetrabutylammonium hydroxide (TBAP).
[b] Maximum intensity at 1.0 cm. thickness.
[c] Time required for the light decay to ¼ of its maximum.
[d] Time required for the emission of ¾ of the total light.

TABLE XI.—THE EFFECT OF TBAP AND BASES ON THE PCPO CHEMILUMINESCENT REACTION [a]

| Additive | Additive (1×10$^2$ mole l$^{-1}$) | $I_{max}$ [b] (ft. lamberts) | $t_1/_4I$ [c] | $t_3/_4$ [d] (min.) | $t_1/_4I/t_3/_4$ A. | Quantum yield (10$^2$× Einsteins l$^{-1}$) |
|---|---|---|---|---|---|---|
| None | | 0.21 | 216.28 | 484.92 | 0.45 | 2.63 |
| TBAP | 5.00 | 3.93 | 92.55 | 102.66 | 0.90 | 18.49 |
| TBAP plus C$_6$Cl$_5$OK | 5.00 / 0.01 | 55.38 | 2.38 | 3.63 | 0.66 | 7.28 |
| C$_6$Cl$_5$OK | 0.01 | 63.68 | 2.49 | 2.41 | 1.03 | 7.78 |
| C$_6$Cl$_5$ONBu$_4$ | 0.01 | 66.45 | 2.83 | 3.12 | 0.91 | 9.37 |

[a] Reactions are 1×10$^{-2}$ M bis(pentachlorophenyl)oxalate (PCPO), 1×10$^{-3}$ M 9,10-bis(phenylethynyl)anthracene (BPEA), 2×10$^{-2}$ M H$_2$O$_2$ and tetrabutylammonium perchlorate (TBAP) in o-dichlorobenzene-ethyl benzoate (50–50) at 25° C.
[d] Maximum intensity at 1.0 cm. thickness.
[c] Time required for the light intensity to decay to ¼ of its maximum.
[b] Time required for the emission of ¾ of the total light.

EXAMPLE XII

Figure 2:
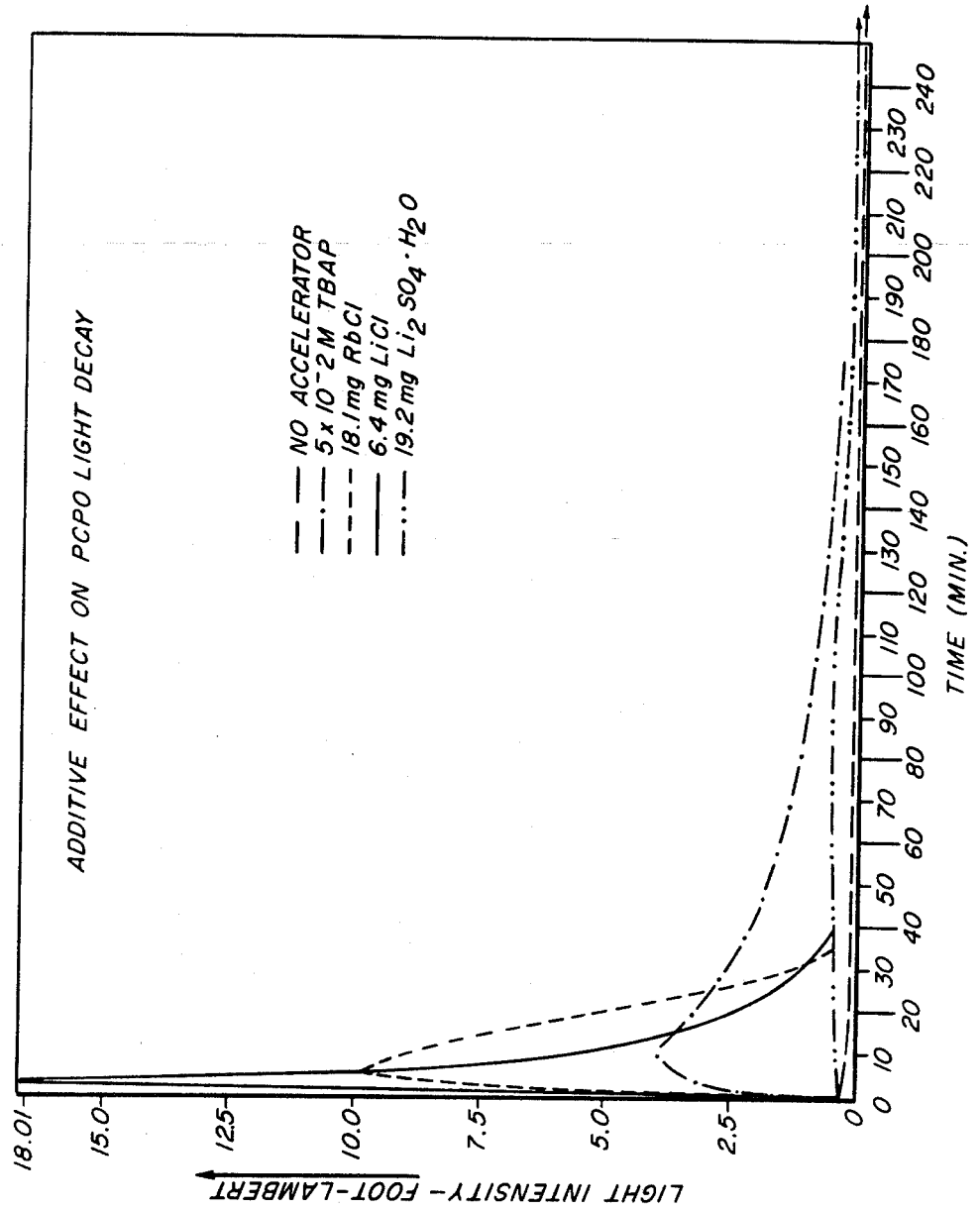

The experiments showing the effect of four additives of this invention on the light decay of the bis(pentachlorophenyl)oxalate reaction are shown in FIG. 2. The results show that all four additives, tetrabutylammonium perchlorate, rubidium chloride, lithium chloride and lithium sulfate, increased the brightness, rate, quantum yield and light capacity substantially.

EXAMPLE XIII

Figure 3:
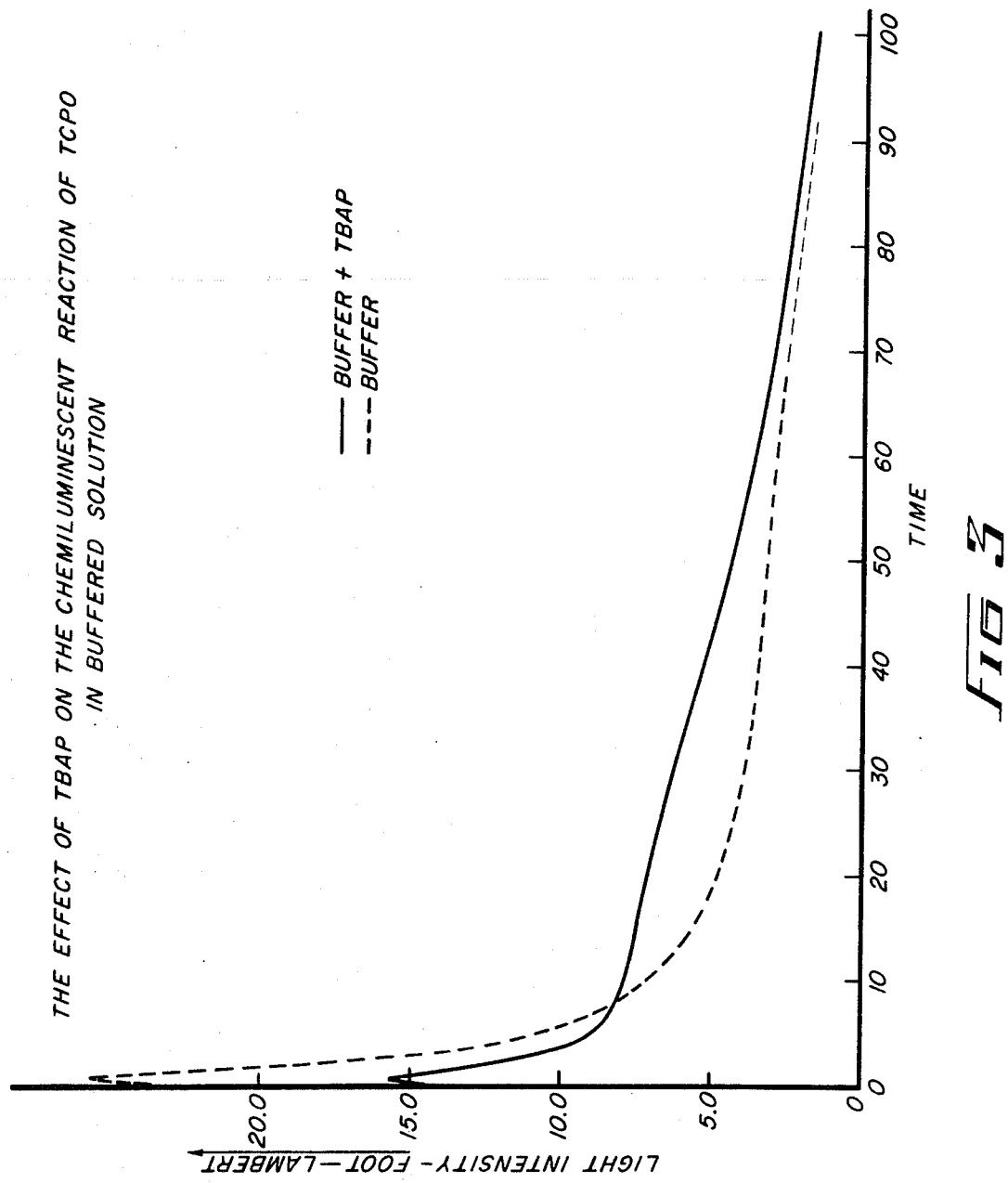

Experiments of the example show the effects of tetrabutylammonium perchlorate on the chemiluminescence from bis(2,4,6-trichlorophenyl)oxalate in the presence of a salicylic acid-tetrabutyl-ammonium hydroxide buffer. The results shown in Table XIII indicate that the reaction rate is increased significantly. The light decay curves shown in FIG. 3 demonstrate that a more uniform preferred light emission is obtained in the presence of TBAP.

EXAMPLE XIV

The experiments of the example are carried out as described in Example VI. The results in Table XIV show the effect of tetrabutylammonium perchlorate and oxalic acid added together to the chemiluminescent reaction of bis(2,4-dinitrophenyl)oxalate.

TABLE XIV

| Exp.[1] No. | Additives (C$_4$H$_9$)$_4$N$^+$ClO$_4^-$ (mole l$^{-1}$) | Oxalic acid anhydrous (mole l$^{-1}$) | $t_{¾}$ [2] (min.) | $I_{max}$ [3] (ft. lamberts) | Quantum yield (Einsteins mole l$^{-1}$×10$^2$) | Radiation capacity (Einsteins l$^{-1}$×10$^4$) |
|---|---|---|---|---|---|---|
| 1 | None | None | 3.62 | 224.0 | 18.6 | 18.6 |
| 2 | 0.1 | do | 0.85 | 1,484.0 | 23.8 | 23.8 |
| 3 | 0.1 | 5×10$^{-3}$ | 18.5 | 18.1 | 18.0 | 18.0 |
| 4 | 0.1 | 1×10$^{-3}$ | 2.73 | 155.5 | 20.8 | 20.8 |
| 5 | 0.01 | None | 1.46 | 800.0 | 23.5 | 23.5 |
| 6 | 0.01 | 5×10$^{-3}$ | 62.73 | 4.14 | 14.6 | 14.6 |
| 7 | 0.01 | 1×10$^{-3}$ | 7.3 | 47.4 | 17.7 | 17.7 |
| 8 | None [4] | 1.3×10$^{-3}$ | 114.9 | 2.2 | 12.5 | 12.5 |
| 9 | do | None | 2.8 | 234.1 | 17.2 | 17.2 |

[1] Reactant concentrations were 1×10$^{-2}$ mole l$^{-1}$ bis((2,4-dinitrophenyl)oxalate, 2.5×10$^{-2}$ mole l$^{-1}$ H$_2$O$_2$ and 5×10$^{-4}$ mole l$^{-1}$ rubrene in dimethyl phthalate at 25° C.
[2] The time required for the emission of 75% of the available light.
[3] Maximum light intensity.
[4] 5×10$^{-2}$ mole l$^{-1}$ H$_2$O$_2$ and 6.4 ×10$^{-4}$ mole l$^{-1}$ rubrene were used.

The experiments in Table XIV indicate that when the additives of this invention are used together with a life extender additive the beneficial effects of each is obtained. The two additives compliment each other. The rate accelerating, quantum yield increasing and light capacity increasing effect of tetrabutylammonium perchlorate (TBAP), (Experiments 1, 2, 5), is combined with the rate decelerating quantum yield decreasing effect (Experiments 8, 9) of the oxalic acid life extender. When an additive mixture of 20 parts TBAP to 1 part oxalic acid is used (Experiment 3) the quantum yield of the additives reaction (Experiment 1) is preserved while the lifetime is increased fivefold. Alternately, when a mixture of 100 parts TBAP to 1 part oxalic acid is used (Experiment 4) the lifetime of the reaction is held similar to the lifetime of the additiveless reaction (Experiment 1) while the quantum yield is increased by 12%.

EXAMPLE XV

The experiments of this example were carried out as in Example I except for the employment of the glyoxal chemiluminescent compounds listed in Table XV below in the place of the oxalate-ester chemiluminescent compound.

from a chemiluminescent light composition comprising (a) a chemiluminescent reactant selected from the group consisting of (1) an ester of the formula

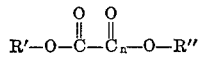

where R' and R" are aryl and substituted aryl and $n$ is at least 1, and (2) a pyridonyl glyoxal compound of the formula

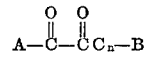

TABLE XV

| Bis(1,2-dihydro-2-oxo-pyridyloxal | $H_2O_2$ (mole $1^{-1}$) | Rubrene (mole $1^{-1}$) | Methanesulfonic acid (mole $1^{-1}$) | $(G_4H)_4N^+C10^-$ (mole $1^{-1}$) | $t_{3/4}$ (min.) | $I_{max}$ (ft. lambert) | Quantum yield (Einsteins mole$^{-1}$ $1^{-1}$) |
|---|---|---|---|---|---|---|---|
| 0.01 mole $1^{-1}$ | 0.01 | 8×10$^{-4}$ | 0.01 | None | 8.92 | 45.90 | 9.2 |
| 0.01 mole $1^{-1}$ | 0.01 | 8×10$^{-4}$ | 0.01 | 0.01 | 11.43 | 47.50 | 10.7 |

NOTE.—Table XV illustrates that the additive salts of this invention are effective with non-ester chemiluminescent compounds of the type of copending application, Serial No. 547,782.

EXAMPLE XVI

Figure 4:
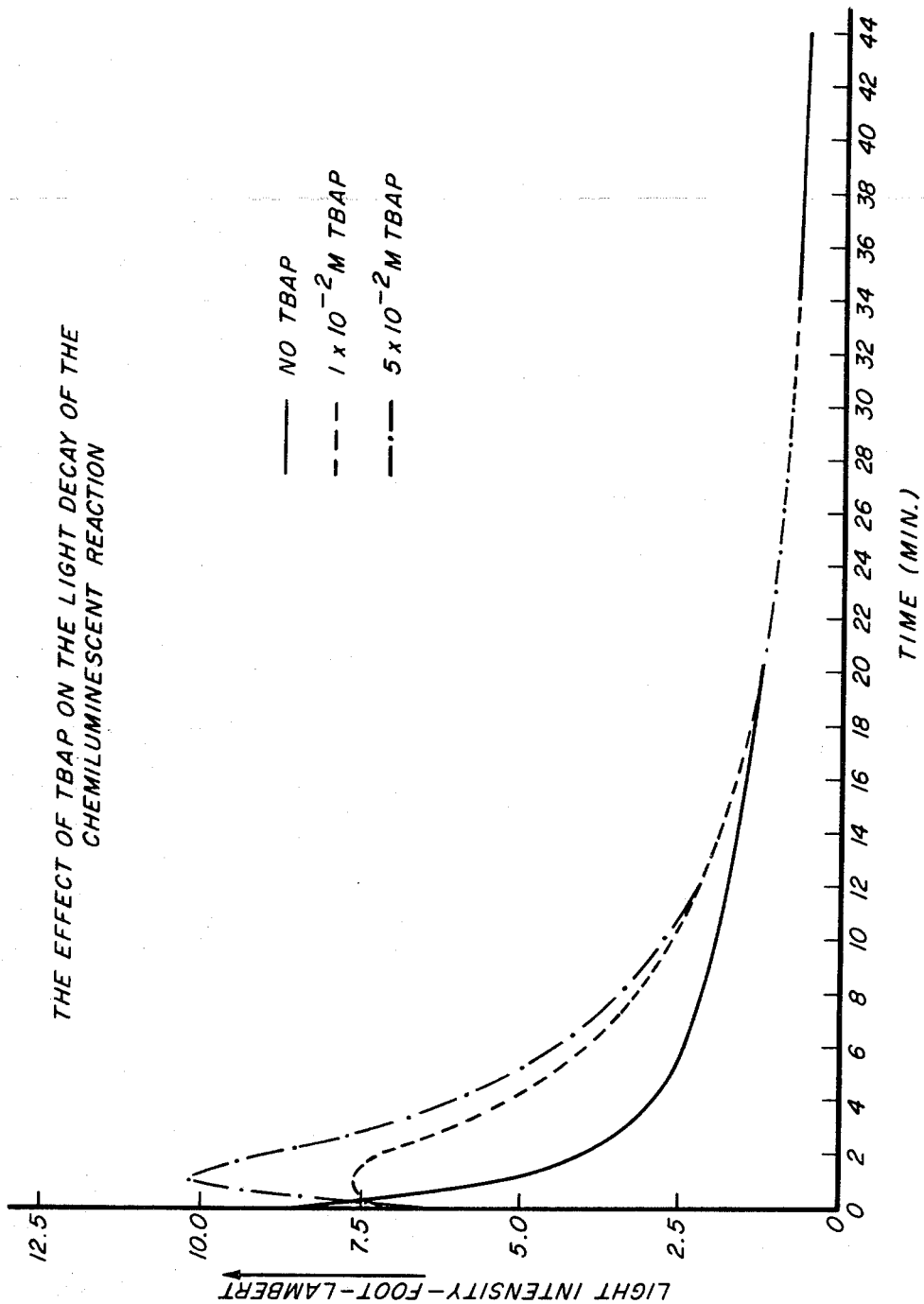

Experiments showing the effects of tetrabutylammonium perchlorate (TBAP) on the bis(1,2 - dihydro - 2 - oxopyridyl)glyoxal reaction are summarized in Table XVI. The results indicate that TBAP accelerates the rate and increases the brightness of the chemiluminescent reaction. The effect of TBAP on the light decay curves of the same reactions is shown in FIG. 4.

TABLE XVI.—THE EFFECT OF TRAP ON THE PG CHEMILUMINESCENT REACTION [a]

| TBAP (×10²) | $I_{max}$ [b] ft. lambert | $t_{3/4}$ [c] (min.) | $t_{1/4}$ [d] (min.) | $\left(\frac{t_{1/4}I}{t_{3/4}}\right)$ | Quantum yield (10²× Einsteins mole$^{-1}$ $1^{-1}$) |
|---|---|---|---|---|---|
|  | 8.55 | 8.40 | 51.92 | 0.16 | 5.75 |
| 1.0 | 7.52 | 14.05 | 72.30 | 0.51 | 6.02 |
| 5.0 | 10.07 | 10.78 | 18.91 | 0.57 | 5.97 |

[a] Reactions are 1×1$^{-2}$ M bis(1,2-dihydro-2-oxo-pyridyl)glyoxal (PG), 1.5×10$^{-3}$ M 9,10-bis(phenylethynyl)anthracene (PEA), 5×10$^{-3}$ M methanesulfonic acid and 3.0×10$^{-2}$ M $H_2O_2$ and tetrabutylammonium perchlorate (TBAP) in dimethyl phthalate at 25° C.
[b] Maximum light intensity at 1.0 cm. thickness.
[c] Time required for the light decay to ¼ of its maximum.
[d] Time required for the emission of ¾ of the total light.

It is within the scope of this invention to make such modifications of the compositions and processes disclosed herein as would be obvious to a person of ordinary skill in this art. Also it is within the scope of this invention to form an apparatus or article such as a container which, for example, may be either (1) a substantially insoluble or alternatively (2) a dissolvable capsule in which the reactant or composition of this invention is substantially enclosed for subsequent reaction with other ingredients necessary to produce chemiluminescent light.

Thus, while I have set forth certain specific embodiments and preferred modes of practice of the invention, this is solely for illustration, and various changes and modifications of the invention can be made without departing from the spirit of the disclosure or the scope of the appended claims.

What is claimed is:
1. A method for extending the lifetime and increasing the quantum yield of chemiluminescent light emission where $n$ is as above defined, A is a nitrogen containing heterocyclic group attached through a ring nitrogen atom and substituted by at least one keto group, B is selected from the group consisting of said A, an alcohol, and an amine group; (b) a hydroperoxide; (c) an organic fluorescent compound and (d) at least one organic solvent for said (a), (b) and (c); which comprises adding to said chemiluminescent light composition at least one compound selected from the group consisting of substantially neutral and basic salts which contain cations selected from the group consisting of alkali metal, tetraalkyl and tetraaryl ammonium, phosphonium and arsonium cations.

2. A method according to claim 1, including an organic solvent in which said ester comprises a bisphenyl ester formed from an acid and an aromatic alcohol, said alcohol being characterized by an acid ionization constant in water greater than 1.3×10$^{-10}$, and in which said added salt is soluble at least to the extent of about 1×10$^{-6}$ mole $1^{-1}$, in said organic solvent of the chemiluminescent reaction, in which said salt is further characterized by at least a minor amount of dissociation into solvated ions.

3. A method according to claim 1, in which said ionized salt comprises a quaternary ammonium or phosphonium salt and in which said ester comprises an electronegatively substituted aryl oxalate ester.

4. A chemiluminescent method according to claim 1, including an addition of base compound which will impart a basic pH to the chemiluminescent composition.

5. A method according to claim 1 wherein said cations are selected from the group consisting of lithium, rubidium and cesium.

References Cited

UNITED STATES PATENTS 3,311,564  3/1967  Cline _____ 252—188.3

JOHN D. WELSH, Primary Examiner

U.S. Cl. X.R.

252—186